(12) United States Patent
Iwahashi et al.

(10) Patent No.: US 7,462,574 B2
(45) Date of Patent: Dec. 9, 2008

(54) SILICA GLASS CONTAINING TIO$_2$ AND OPTICAL MATERIAL FOR EUV LITHOGRAPHY

(75) Inventors: Yasutomi Iwahashi, Yokohama (JP); Akio Koike, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/174,533

(22) Filed: Jul. 6, 2005

(65) Prior Publication Data

US 2005/0245383 A1 Nov. 3, 2005

Related U.S. Application Data

(63) Continuation of application No. PCT/JP2004/004829, filed on Apr. 2, 2004.

(30) Foreign Application Priority Data

| Apr. 3, 2003 | (JP) | ............................ 2003-100798 |
| Apr. 3, 2003 | (JP) | ............................ 2003-100799 |
| Mar. 17, 2004 | (JP) | ............................ 2004-076312 |

(51) Int. Cl.
  *C03C 3/06* (2006.01)
  *G02B 1/00* (2006.01)
  *C03B 19/00* (2006.01)
  *C03B 19/14* (2006.01)

(52) U.S. Cl. ........................ 501/54; 501/53; 250/504 R; 359/350

(58) Field of Classification Search .................... 501/53, 501/54; 250/504 R; 359/350
See application file for complete search history.

(56) References Cited

U.S. PATENT DOCUMENTS

| 5,696,038 | A | 12/1997 | Maxon |
| 5,970,751 | A | 10/1999 | Maxon et al. |
| 6,465,272 | B1 | 10/2002 | Davis et al. |
| 6,499,315 | B1 | 12/2002 | Nishimura et al. |
| 6,576,380 | B2 | 6/2003 | Davis et al. |
| 7,053,017 | B2 * | 5/2006 | Hrdina et al. ................. 501/54 |
| 2002/0157421 | A1 * | 10/2002 | Ackerman et al. ........... 65/17.6 |
| 2003/0159464 | A1 | 8/2003 | Bowden et al. |
| 2003/0226377 | A1 * | 12/2003 | Barrett et al. ................ 65/17.4 |
| 2005/0245383 | A1 | 11/2005 | Iwahashi et al. |

FOREIGN PATENT DOCUMENTS

| EP | 0 293 064 | 11/1988 |
| EP | 0 901 989 | 3/1999 |
| WO | WO 98/00372 | 1/1998 |
| WO | WO 02/32622 | 4/2002 |
| WO | 02/088036 | 11/2002 |
| WO | WO 03/076352 | 9/2003 |
| WO | WO 03/077038 | 9/2003 |

OTHER PUBLICATIONS

U.S. Appl. No. 11/172,872, filed Jul. 5, 2005, Iwahashi, et al.
U.S. Appl. No. 11/174,533, filed Jul. 6, 2005, Iwahashi, et al.
U.S. Appl. No. 11/172,950, filed Jul. 5, 2002, Iwahashi, et al.
U.S. Appl. No. 11/435,887, filed May 18, 2006, Iwahashi, et al.
U.S. Appl. No. 11/589,875, filed Oct. 31, 2006, Koike, et al.
U.S. Appl. No. 11/957,855, filed Dec. 17, 2007, Iwahashi, et al.
Kenneth E. Hrdian, et al., "Characterization and Characteristics of a ULE® Glass Tailored for EUVL Needs", Proc. SPIE v4688 (2002), pp. 454-461, Presented at Emerging Lithographic Technologies VI, Santa Clara, CA, Mar. 3-8, 2002.
Phil Fenn, et al., "Characterization and Characteristics of a ULE® Glass Tailored for EUVL Needs", Poster Session: ML4688-52, Presented at Emerging Lithographic Technologies VI, Santa Clara, CA, Mar. 3-8, 2002.
Christine Heckle, et al., "Development of Mask Materials for EUVL", Proc. SPIE v4889 (2002) pp. 1113-1120, no month.
B. Ackerman et al., "Improved Characteristics of ULE® Glass for Meeting EUV Lithograph Needs", Poster Session, 1st International EUV Lithography Symposium, Dallas, Texas, Oct. 15-17, 2002.
Hrdina et al., "Measuring and Tailoring CTE within ULE® Glass," Proc. SPIE v5037 (2003), pp. 227-235. Presented at Emerging Lithographic Technologies VII Conference, Santa Clara, CA Feb. 25, 2003.
Bradford Ackerman, et al., "An Old Material Finds a New Application," Laser Focus World v38 (11) 2002, pp. 109-113. Note: p. 9 indicates the document was received Nov. 1, 2002.
Henry E. Hagy, "High Precision Photoelastic and Ultrasonic Techniques for Determining Absolute and Differential Thermal Expansion of Titania-Silica Glasses," Applied Optics, vol. 12, No. 7, Jul. 1973, pp. 1440-1446.
Henry E. Hagy, et al., "Determining absolute thermal expansion of titania-silica glasses: a refined ultrasonic method," Applied Optics, vol. 14 No. 9, Sep. 1975, pp. 2099-2103.
Corning Code 7971, Titanium Silicate Zero Expansion Material, Glass Bulletin, 2000, no month.
Corning Code 7971, ULE Titanium Silicate, Glass Bulletin 1985, Corning Glass Works, Corning, N.Y. 14831, 1985, no month.
G. J. Copley, et al., "The influence of Titania upon the Thermal Expansion of Vitreous Silica", Physics and Chemistry of Glasses, vol. 14, No. 4, Aug. (1973), pp. 73-76.

(Continued)

*Primary Examiner*—Anthony J Green
(74) *Attorney, Agent, or Firm*—Oblon, Spivak, McClelland, Maier & Neustadt, P.C.

(57) ABSTRACT

A silica glass containing TiO$_2$, characterized in that the fluctuation of the refractive index ($\Delta n$) is at most $2 \times 10^{-4}$ within an area of 30 mm×30 mm in at least one plane. A silica glass containing TiO$_2$, characterized in that the TiO$_2$ concentration is at least 1 mass %, and the striae pitch is at most 10 μm. An optical material for EUV lithography, characterized in that it is made of a silica glass containing TiO$_2$, and the fluctuation of the refractive index ($\Delta n$) is at most $2 \times 10^{-4}$ in a plane perpendicular to the incident light direction. An optical material for EUV lithography, characterized in that it is made of a silica glass containing TiO$_2$, wherein the TiO$_2$ concentration is at least 1 mass %, and the difference between the maximum value and the minimum value of the TiO$_2$ concentration is at most 0.06 mass % in a plane perpendicular to the incident light direction.

19 Claims, No Drawings

OTHER PUBLICATIONS

William M. Tong, et al., "Mask substrate requirements and development for extreme ultraviolet lithography (EUVL)", Proc. SPIE vol. 3873 (1999). pp. 412-428, no month.

D15A. Quotation to Customer 1 dated Feb. 26, 2003 for sale of Corning 7972 ULE EUV Grade glass having a CTE of 0± 5ppb/ °C.

D15B. Closed order for Customer 1 dated Mar. 2003 for a shipped order of Corning [7972] ULE EUV Grade glass having a CTE of 0 ± 5 ppb/ °C.

D16A. Quotation to Customer 2 dated Apr. 1, 2003 for sale of Corning 7972 ULE EUV Grade glass.

D16B. Closed order for Customer 2 dated Apr. 7, 2003 for a shipped order of Corning [7972] ULE EUV Grade glass.

D17. Affidavit of Junichi Yokoyama regarding offers to sell Corning ULE® EUV glass (D15 and D16), Jul. 11, 2008.

D18. Affidavit of Kenneth E. Hrdina regarding the availability to the public of D4A and D5 and regarding Corning ULE® EUV Grade glass, Jul. 16, 2008.

D19. Affidavit of Walter M. Douglas regarding identification of the ULE® EUV glass (D15 and D16), Jul. 16, 2008.

* cited by examiner

SILICA GLASS CONTAINING TiO₂ AND OPTICAL MATERIAL FOR EUV LITHOGRAPHY

CROSS-REFERENCE TO A RELATED APPLICATION

The present application is a continuation of International Application PCT/JP04/04829, filed Apr. 2, 2004.

TECHNICAL FIELD

The present invention relates to a silica glass containing $TiO_2$ (hereinafter referred to as $TiO_2$—$SiO_2$ glass) and a process for its production. Particularly, it relates to $TiO_2$—$SiO_2$ glass to be used for an optical material for an exposure device to be used for EUV lithography and a process for its production. In the present invention, EUV (Extreme Ultra Violet) light means light having a waveband in a soft X-ray region or in a vacuum ultraviolet region and specifically means light having a wavelength of from 0.2 to 100 nm.

BACKGROUND ART

Heretofore, in photolithography, it is common to employ an exposure device to transfer a fine circuit pattern onto a wafer to produce an integrated circuit. Along with high integration and high functionality of integrated circuits, microsizing of integrated circuit has been progressing, and an exposure device is required to form an image of a circuit pattern on a wafer with a high resolution in a deep focal depth, whereby blue shift of the exposure light source is in progress. The exposure light source has been advanced from the conventional g-line (wavelength: 436 nm), i-line (wavelength: 365 nm) or KrF excimer laser (wavelength: 248 nm), and now an ArF excimer laser (wavelength: 193 nm) is being used. Further, in order to be prepared for an integrated circuit for the next generation where the line width of a circuit pattern will be less than 100 nm, it is considered to be prospective to employ a $F_2$ laser (wavelength: 157 nm) as the exposure light source, but it is considered that even this can not cover beyond a generation of a line width of 70 nm.

Under these circumstances, a lithographic technique employing typically a light having a wavelength of 13 nm among EUV light (extreme ultraviolet light) as the exposure light source, has attracted attention, as it may be applied to the printing of feature sizes of 50 nm and smaller. The image-forming principle of the EUV lithography (hereinafter referred to as "EUVL") is the same as the conventional photolithography to such an extent that a mask pattern is transferred by means of an optical projection system. However, in the energy region of EUV light, there is no material to let the light pass therethrough. Accordingly, a refraction optical system can not be used, and an optical system will be required to be a reflection optical system in all cases.

The optical material for the exposure device to be used for EUVL will be a photomask, a mirror or the like, and it is basically constituted of (1) a base material, (2) a reflective multilayer formed on the base material and (3) an absorber layer formed on the reflective multilayer. For the multilayer, it is studied to form layers of Mo/Si alternately, and for the absorber layer, it is studied to use Ta or Cr as the layer-forming material. As the base material, a material having a low thermal expansion coefficient is required so that no strain will be formed even under irradiation with EUV light, and a glass having a low thermal expansion coefficient is being studied.

$TiO_2$—$SiO_2$ glass is known to be a very low thermal expansion material having a coefficient of thermal expansion (CTE) smaller than quartz glass, and the coefficient of thermal expansion can be controlled by the $TiO_2$ content in the glass, whereby it is possible to obtain a zero expansion glass having a coefficient of thermal expansion being close to zero. Accordingly, $TiO_2$—$SiO_2$ glass is prospective as a material to be used for an optical material for the exposure device for EUVL.

In a conventional method for preparing $TiO_2$—$SiO_2$ glass, firstly, a silica precursor and a titania precursor are, respectively, converted into a vapor form, and then mixed. Such a vapor form mixture is fed into a burner and thermally decomposed to form $TiO_2$—$SiO_2$ glass particles. Such $TiO_2$—$SiO_2$ glass particles will be deposited in a refractory container and at the same time will be melted to form $TiO_2$—$SiO_2$ glass. However, $TiO_2$—$SiO_2$ glass prepared by this method has had a periodical fluctuation of the $TiO_2/SiO_2$ ratio, which appears as striped striae with a 100 to 200 μm pitch.

Further, U.S. patent application publication No. 2002/157421 discloses a method which comprises forming a $TiO_2$—$SiO_2$ porous glass body, converting it to a glass body, and then obtaining a mask substrate therefrom.

The striped striae of the $TiO_2$—$SiO_2$ glass are considered to form as the difference in the refractive index increases due to the periodical fluctuation of the $TiO_2/SiO_2$ ratio in the glass material. When it is to be used as an optical material for the exposure device for EVUL, the $TiO_2$—$SiO_2$ glass is required to be polished so that the glass will have an ultra smooth surface. However, in the $TiO_2$—$SiO_2$ glass, at the portion where the $TiO_2/SiO_2$ compositional ratio is different, the mechanical and chemical properties of the glass vary depending upon the composition, whereby the polishing rate tends to be non-uniform, and it is difficult to finish so that the glass surface after polishing will be ultra smooth. Further, if a $TiO_2$—$SiO_2$ glass having striped striae with a 100 to 200 μm pitch, is polished, "waving" will be formed on the glass surface with a pitch of the same degree as the striae pitch, whereby it is very difficult to obtain ultra smooth surface.

In recent years, it has been pointed out that it is necessary to reduce MSFR (Mid-Spatial Frequency Roughness) having a waving pitch of from 10 μm to 1 mm, as an extremely important characteristic required for an optical material for the exposure device for EUVL. When a conventional $TiO_2$—$SiO_2$ glass is polished, it has a waving with a 100 to 200 μm pitch for the above-mentioned reason, whereby it has been very difficult to reduce MSFR.

Accordingly, in order to finish so that the glass surface after polishing will be ultra smooth, as an optical material for the exposure device for EUVL, it is considered effective to minimize the fluctuation of the $TiO_2/SiO_2$ ratio of the $TiO_2$—$SiO_2$ glass to make the polishing rate constant at the glass surface, and to reduce the striae pitch to a level of at most 10 μm to reduce MSFR.

Further, even with a $TiO_2$—$SiO_2$ glass substrate having the same level of smoothness (Roughness (rms)), rough surface of a glass whose striae pitch is smaller can be polished efficiently in a short time, and can be finished to be ultra smooth easily.

Further, it is important to make the $TiO_2/SiO_2$ ratio uniform in the $TiO_2$—$SiO_2$ glass, with a view to minimizing the fluctuation of the coefficient of thermal expansion within the glass. Accordingly, in addition to minimizing the fluctuation of the $TiO_2/SiO_2$ ratio in the small areas so-called striae, it is preferred to minimize the fluctuation of the $TiO_2/SiO_2$ ratio in the entire region of the material.

DISCLOSURE OF THE INVENTION

Embodiment 1 of the present invention provides a silica glass containing $TiO_2$, characterized in that the fluctuation of the refractive index ($\Delta n$) is at most $2\times 10^{-4}$ within an area of 30 mm×30 mm in at least one plane.

Embodiment 2 provides the silica glass containing $TiO_2$ according to Embodiment 1, wherein the fluctuation of the refractive index ($\Delta n$) is at most $2\times 10^{-4}$ within an area of 30 mm×30 mm in each of two orthogonal planes.

Embodiment 3 provides a silica glass containing $TiO_2$, characterized in that the $TiO_2$ concentration is at least 1 mass %, and the difference between the maximum value and the minimum value of the $TiO_2$ concentration is at most 0.06 mass % within an area of 30 mm×30 mm in at least one plane.

Embodiment 4 provides the silica glass containing $TiO_2$ according to Embodiment 3, wherein the difference between the maximum value and the minimum value of the $TiO_2$ concentration is at most 0.06 mass % within an area of 30 mm×30 mm in each of two orthogonal planes.

Embodiment 5 provides a silica glass containing $TiO_2$, characterized in that the $TiO_2$ concentration is at least 1 mass %, and the striae pitch is at most 10 μm.

Embodiment 6 provides the silica glass containing $TiO_2$ according to Embodiment 1, 2, 3 or 4, wherein the striae pitch is at most 10 μm.

Embodiment 7 provides an optical material for EUV lithography, characterized in that it is made of a silica glass containing $TiO_2$, and the fluctuation of the refractive index ($\Delta n$) is at most $2\times 10^{-4}$ in a plane perpendicular to the incident light direction.

Embodiment 8 provides the optical material for EUV lithography according to Embodiment 7, wherein there is no striae which cause a fluctuation of the refractive index ($\Delta n$) exceeding $2\times 10^{-4}$ in a plane perpendicular to the incident light direction.

Embodiment 9 provides an optical material for EUV lithography, characterized in that it is made of a silica glass containing $TiO_2$, wherein the $TiO_2$ concentration is at least 1 mass %, and the difference between the maximum value and the minimum value of the $TiO_2$ concentration is at most 0.06 mass % in a plane perpendicular to the incident light direction.

Embodiment 10 provides the optical material for EUV lithography according to Embodiment 9, wherein there is no striae which cause a difference between the maximum value and the minimum value of the $TiO_2$ concentration, exceeding 0.06 mass % in a plane perpendicular to the incident light direction.

Embodiment 11 provides the optical material for EUV lithography according to any one of Embodiments 6 to 10, wherein the striae pitch is at most 10 μm.

Embodiment 12 provides an optical material for EUV lithography employing the silica glass containing $TiO_2$, as defined in any one of Embodiments 1 to 6.

According to the present invention, it is possible to obtain $TiO_2$—$SiO_2$ glass having a small surface roughness. Accordingly, it is very useful as a material for a component constituting an optical system to be used for EUVL.

BEST MODE FOR CARRYING OUT THE INVENTION $TiO_2$—$SiO_2$ glass is known to have a coefficient of thermal expansion which changes depending upon the concentration of $TiO_2$ contained, and the coefficient of thermal expansion of $TiO_2$—$SiO_2$ glass containing about 7 mass % of $TiO_2$ becomes substantially zero at near room temperature.

The $TiO_2$—$SiO_2$ glass of the present invention is preferably a silica glass containing from 1 to 12 mass % of $TiO_2$. If the content of $TiO_2$ is less than 1%, zero expansion may not be accomplished, and if it exceeds 12 mass %, the coefficient of thermal expansion is likely to be negative. The content of $TiO_2$ is more preferably from 5 to 9 mass %.

The striae pitch is preferably at most 10 μm, more preferably at most 7 μm. If the striae pitch exceeds 10 μm, it tends to be difficult to reduce MSFR of the polished surface. In this specification, "the fluctuation of the $TiO_2$ concentration" is defined to be the difference between the maximum value and the minimum value of the $TiO_2$ concentration in one plane. The fluctuation of the $TiO_2$ concentration in each area of 30 mm×30 mm, that is small area, is preferably at most 0.06 mass %, more preferably at most 0.04 mass %. If the fluctuation of the $TiO_2$ concentration exceeds 0.06 mass %, it tends to be difficult to obtain an adequate smoothness by polishing. A process for producing a $TiO_2$—$SiO_2$ glass having the fluctuation of the $TiO_2$ concentration controlled to be within 0.06 mass %, is as follows. $TiO_2$—$SiO_2$ glass particles (soot) obtained by flame hydrolysis or thermal decomposition of a Si precursor and a Ti precursor as glass-forming materials, by a soot process, are deposited and grown on a target to obtain a porous $TiO_2$—$SiO_2$ glass body, and the obtained porous $TiO_2$—$SiO_2$ glass body is heated to a vitrification temperature to obtain a verified $TiO_2$—$SiO_2$ glass body. The target made of quartz glass may, for example, be used for this process.

The present inventors have investigated the relationship between the rotational speed of the target in the step of obtaining the porous $TiO_2$—$SiO_2$ glass body and the striae pitch of the obtained $TiO_2$—$SiO_2$ glass body in detail. As a result, they have found that as the rotational speed of the target becomes high, the fluctuation of the $TiO_2$ concentration in the $TiO_2$—$SiO_2$ glass body becomes small, and the striae pitch is reduced.

Specifically, a rotational speed of the target at the step of obtaining the porous $TiO_2$—$SiO_2$ glass body is preferably adjusted to be at least 25 rpm, more preferably at least 50 rpm, particularly preferably at least 100 rpm. The fluctuation of the $TiO_2$ concentration in the $TiO_2$—$SiO_2$ glass body will be at most 0.06 mass %, and the striae pitch will be at most 10 μm by this method.

In this method, it is more preferred to stabilize the supply of the raw materials as the glass-forming materials, with a view to reducing the degree and pitch of the striae.

The striae observed in a $TiO_2$—$SiO_2$ glass, are attributable to the fluctuation of the $TiO_2/SiO_2$ ratio. Further, if the $TiO_2/SiO_2$ ratio fluctuates, the absolute refractive index of glass will fluctuate. For example, at a portion where the $TiO_2$ concentration is high, the refractive index tends to be high as compared with a portion where the $TiO_2$ concentration is low.

The present inventors have measured the absolute refractive indices of several $TiO_2$—$SiO_2$ glasses having different $TiO_2$ concentrations and have found that the following relation is satisfied between the $TiO_2$ concentration and the refractive index within a range where the $TiO_2$ concentration is at most 12 mass %.

$$\text{Absolute refractive index} = 3.27\times 10^{-3}\times TiO_2 \text{ concentration(mass \%)} + 1.459 \qquad (1)$$

By using the formula (1), it will be possible to calculate the fluctuation of the $TiO_2$ concentration ($\Delta TiO_2$) from the fluctuation of the refractive index ($\Delta n$) of the $TiO_2$—$SiO_2$ glass.

Specifically, when the fluctuation of the refractive index ($\Delta n$) is 200 ppm, the fluctuation of the $TiO_2$ concentration ($\Delta TiO_2$) is 0.06 mass %.

The method of obtaining the striae pitch is as follows. The fluctuation of the refractive index ($\Delta n$) in the plane is measured, and the distance from the portion where the refractive index is high to the portion where the refractive index is low, is measured by means of a microscope.

The method for measuring the fluctuation of the refractive index ($\Delta n$) is different as between the case of the fluctuation of the refractive index in small areas ($\Delta n_1$), and the case of the fluctuation of the refractive index in a broad area ($\Delta n_2$), as shown hereinafter.

The fluctuation of the refractive index in small areas ($\Delta n_1$) so-called striae, is measured as follows. From the $TiO_2$—$SiO_2$ glass body, a cube of about 40 mm×40 mm×40 mm is, for example, cut out, and each side of the cube is sliced in a thickness of 1 mm to obtain a plate-shaped $TiO_2$—$SiO_2$ glass block of 30 mm×30 mm×1 mm. By a Fizeau interferometer, a helium neon laser beam is vertically irradiated to an area of 30 mm×30 mm of this glass block, and the refractive index distribution within the area is examined by magnifying to 2 mm×2 mm, for example, where the striae can be sufficiently observed, and the fluctuation of the refractive index ($\Delta n$) is measured.

In a case where an area of 30 mm×30 mm is directly measured, it is possible that the size of one pixel in CCD of the interferometer is not smaller than the width of the striae sufficiently, so that the striae may not be detected. Therefore, the entire area of 30 mm×30 mm is divided into a lot of small areas at a level of, for example, 2 mm×2 mm, and the fluctuation of the refractive index ($\Delta n_1$) in each small area, is measured, and the maximum value is taken as the fluctuation of the refractive index ($\Delta n$) in an area of 30 mm×30 mm.

For example, in a case of CCD having 512×480 valid pixels, one pixel corresponds to about 4 square μm in a visual field of 2 mm×2 mm. Accordingly, striae with a pitch of at least 10 μm can be sufficiently detected, but striae smaller than this may not be detected sometime. Therefore, in a case where striae of at most 10 μm are to be measured, it is advisable to set at least that one pixel corresponds to at most 1 to 2 square μm. In Examples in this specification, the fluctuation of the refractive index ($\Delta n_1$) was measured so that one pixel corresponds to about 2 square μm by measuring an area of 2 mm×2 mm by means of CCD having 900×900 valid pixels.

On the other hand, the fluctuation of the refractive index in a broad area such as an area irradiated with EUV light to be used for exposure ($\Delta n_2$), is measured as follows. A formed $TiO_2$—$SiO_2$ glass body of 160 mm×160 mm×150 mm is sliced into a block of 7 mm in thickness to obtain a $TiO_2$—$SiO_2$ glass block of 160 mm×160 mm×7 mm. By a Fizeau interferometer, a helium neon laser beam is vertically irradiated to the face of 160 mm×160 mm of this glass block, and the refractive index distribution within an area of 100 mm×100 mm is examined, and the fluctuation of the refractive index ($\Delta n_2$) is measured.

In Examples in this specification, the fluctuation of the refractive index ($\Delta n_2$) was measured so that one pixel corresponds to about 300 to 400 square μm by measuring an area of 100 mm×100 mm by means of CCD having 320×240 valid pixels. In this case, the refractive index difference in an area of about 1 mm can be measured.

By the above-mentioned method for measuring the fluctuation of the refractive index in small areas ($\Delta n_1$), the absolute value of the refractive index can not be measured, and only the refractive index difference can be obtained. Accordingly, if the divided small areas are measured without directly measuring the entire area irradiated with EUV light to be used for exposure, the refractive indices at both ends of the material can not be compared, and it is possible that the fluctuation of the refractive index is estimated to be small. Therefore, the fluctuation of the refractive index is measured over the entire area irradiated with EUV light to be used for exposure, and the measured value is taken as the fluctuation of the refractive index in a plane perpendicular to the incident direction ($\Delta n$).

When the fluctuation of the refractive index in small areas is measured by the above-mentioned method on the same face, if the fluctuation of the refractive index in the small areas ($\Delta n_1$) is larger than the fluctuation of the refractive index in the entire area ($\Delta n_2$), the fluctuation of the refractive index in the small areas ($\Delta n_1$) is taken as the fluctuation of the refractive index in the plane perpendicular to the incident direction ($\Delta n$).

Further, it is very important to make the $TiO_2/SiO_2$ ratio uniform in a broad area such as an area irradiated with EUV light to be used for exposure when the $TiO_2$—$SiO_2$ glass is used as a material for the exposure device for EUVL, with a view to minimizing the fluctuation of the coefficient of the thermal expansion within the material. This fluctuation of the $TiO_2/SiO_2$ ratio causes the refractive index of glass. Accordingly, the fluctuation of the refractive index may be used as an index for the uniformity of the $TiO_2$—$SiO_2$ composition.

$\Delta n$ in the plane perpendicular to the incident light direction is preferably within a range of $2 \times 10^{-4}$, more preferably within $1.5 \times 10^{-4}$, particularly preferably within $1.0 \times 10^{-4}$.

Further, it is very important to make the $TiO_2/SiO_2$ ratio uniform in the small areas like 30 mm×30 mm, with a view to polishing the glass surface ultra smooth. $\Delta n$ in an area of 30 mm×30 mm is preferably within $2 \times 10^{-4}$, more preferably within $1.5 \times 10^{-4}$, particularly preferably within $1.0 \times 10^{-4}$, most preferably within $0.5 \times 10^{-4}$. If $\Delta n$ exceeds the above range, the polishing rate will not be constant depending upon the position, and it tends to be difficult to finish so that the glass surface after polishing will be ultra smooth surface.

If the $TiO_2$—$SiO_2$ glass having a striae pitch of at most 10 μm or the $TiO_2$—$SiO_2$ glass of which a fluctuation of the $TiO_2$ concentration is at most 0.06 mass %, obtained by the present invention, is cut into a size of 160 mm×160 mm×7 mm, and then, an area of 160 mm×160 mm is polished, the value of MSFR (Mid-Spatial Frequency Roughness) which has a waving pitch within a range of from 10 μm to 1 mm and is an index showing smoothness of a polished surface, will be a roughness (rms) of at most 1.5 nm, which is suitable for an optical material for the exposure device for EUVL.

Further, with the $TiO_2$—$SiO_2$ glass having a striae pitch of at least 10 μm or the $TiO_2$—$SiO_2$ glass having a fluctuation of the $TiO_2$ concentration being at least 0.06 mass %, it is difficult to bring MSFR of the polished surface to be at most 1.5 nm, whereby such a glass tends to be inadequate for an optical material for the exposure device for EUVL.

Further, in a $TiO_2$—$SiO_2$ glass having striae, the fluctuation of the $TiO_2/SiO_2$ ratio or $\Delta n$ usually becomes largest at the portion having the striae. Accordingly, in such a case, if the fluctuation of the refractive index or the fluctuation of the $TiO_2/SiO_2$ ratio is reduced in an area of 30 mm×30 mm in at least one plane, by reducing the degree of the striae, it is possible to reduce the fluctuation of the $TiO_2/SiO_2$ ratio or the fluctuation of the refractive index in each of two orthogonal planes simultaneously.

By using the $TiO_2$—$SiO_2$ glass of the present invention, it becomes easy to obtain an optical material for EUV lithography, which is made of the $TiO_2$—$SiO_2$ glass and wherein the fluctuation of the refractive index (Δn) is at most $2\times10^{-4}$ in a plane perpendicular to the incident light direction.

Further, in the present invention, the degree of the striae itself is reduced, whereby it is possible to easily obtain an optical material for EUV lithography which is made of the $TiO_2$—$SiO_2$ glass and wherein the striae are not present which cause the fluctuation of the refractive index (Δn) to exceed $2\times10^{-4}$ in a plane perpendicular to the incident light direction.

Further, by using the $TiO_2$—$SiO_2$ glass of the present invention, it is possible to easily obtain an optical material for EUV lithography which is made of the $TiO_2$—$SiO_2$ glass having a $TiO_2$ concentration of at least 1 mass % and wherein the difference between the maximum value and the minimum value of the $TiO_2$ concentration is at most 0.06 mass %, in a plane perpendicular to the incident light direction.

Further, it is likewise possible to easily obtain an optical material for EUV lithography which is made of the $TiO_2$—$SiO_2$ glass having a $TiO_2$ concentration of at least 1 mass % and wherein the striae are not present which cause the difference between the maximum value and the minimum value of the $TiO_2$ concentration to exceed 0.06 mass % in a plane perpendicular to the incident light direction.

Further, in a wide temperature range of from 0 to 100° C., the $TiO_2$—$SiO_2$ glass can be made to be a zero expansion glass, of which the coefficient of thermal expansion is within a range of 0±200 ppb/° C. Further, in a case where the fictive temperature of the $TiO_2$—$SiO_2$ glass is at most 1,100° C., the temperature range wherein the coefficient of the thermal expansion shows substantially zero, can be made wider. And within a range of from −50 to 150° C., the coefficient of the thermal expansion can be made to be within a range of 0±200 ppb/° C.

Further, when the optical material for EUVL is prepared, by adjusting so that striae will be parallel to patterning surface, it is also possible to reduce the fluctuation of the $TiO_2$/$SiO_2$ ratio or the fluctuation of the refractive index in a plane perpendicular to the incident light direction and to reduce MSFR.

The coefficient of thermal expansion is measured within a range of from −150 to +200° C. by means of a laser interferometer type expansion meter (LIX-1, by manufactured by ULVAC-RIKO, Inc.).

The fluctuation of the coefficient of thermal expansion is measured as follows. A $TiO_2$—$SiO_2$ glass block of 160 mm×160 mm×150 mm is cut and divided into small pieces of $TiO_2$—$SiO_2$ glass of 20 mm×20 mm×10 mm. The coefficient of thermal expansion of each small piece is measured in accordance with the above-mentioned method, to obtain the fluctuation of the coefficient of thermal expansion of the $TiO_2$—$SiO_2$ glass block of 160 mm×160 mm×30 mm.

Further, the optical material for EUV lithography is required to have a small fluctuation of the coefficient of thermal expansion. With the $TiO_2$—$SiO_2$ glass of the present invention, the difference between the maximum value and the minimum value of the $TiO_2$ concentration is at most 0.06 mass %, so the fluctuation of the coefficient of thermal expansion of the $TiO_2$—$SiO_2$ glass of the present invention obtained by a calibration curve will be at most about ±5 ppb/° C. at room temperature. Thus, the $TiO_2$—$SiO_2$ glass of the present invention can be made to have a fluctuation of the coefficient of thermal expansion being, for example, at most ±5 ppb/° C. at room temperature, and as such, is suitable for an optical material for EUV lithography.

The following process can be employed for producing the $TiO_2$—$SiO_2$ glass of the present invention.

Step (a)

$TiO_2$—$SiO_2$ glass particles obtained by flame hydrolysis of a Si precursor and a Ti precursor as glass-forming materials, are deposited and grown on a rotating target to obtain a porous $TiO_2$—$SiO_2$ glass body (the target as disclosed, for example, in JP-B-63-24973). The glass-forming materials are not particularly limited so long as they are materials capable of being gasified. However, the Si precursor may, for example, be a silicon halide compound, such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxy silane represented by $R_nSi(OR)_{4-n}$ (wherein R is a $C_{1-4}$ alkyl group, and n is an integer of from 0 to 3), and the Ti precursor may, for example, be a titanium halide compound such as $TiCl_4$ or $TiBr_4$, or a titanium alkoxide represented by $R_nSi(OR)_{4-n}$ (wherein R is a $C_{1-4}$ alkyl group, and n is an integer of from 0 to 3). Further, as the Si precursor and the Ti precursor, a compound of Si and Ti, such as a silicon-titanium alkoxide, may also be used. Further, the target may not be limited to a rod shape, and a plate-shaped substrate may be employed.

Step (b)

The porous $TiO_2$—$SiO_2$ glass body is heated to a vitrification temperature for vitrification to obtain a vitrified $TiO_2$—$SiO_2$ glass body. In this specification, the vitrification means a state where the porous glass body is densified to such an extent that void spaces can no longer be detected by an optical microscope, and the vitrification temperature means the temperature at which the porous glass body can be densified until void can no longer be detected by an optical microscope. The vitrification temperature is usually from 1,400 to 1,700° C., particularly preferably from 1,450 to 1,650° C.

The atmosphere is preferably an atmosphere of 100% inert gas such as helium or an atmosphere containing an inert gas such as helium, as the main component. The pressure may be a reduced pressure or a normal pressure. Especially in the case of a normal pressure, helium gas may be employed. In the case of a reduced pressure, a pressure of at most 13,000 Pa is preferred. In this specification, "Pa" is meant for an absolute pressure i.e. not a gauge pressure.

Step (c)

The vitrified $TiO_2$—$SiO_2$ glass body obtained in step (b) is heated to a temperature above near the softening temperature and formed into a desired shape to obtain a formed $TiO_2$—$SiO_2$ glass body. The temperature for forming is preferably from 1,500 to 1,800° C. If it is lower than 1,500° C., no substantial deadweight transformation takes place, since the viscosity of the $TiO_2$—$SiO_2$ glass is high, and growth of cristobalite being a crystalline phase of $SiO_2$ or growth of rutile or anatase being a crystalline phase of $TiO_2$ takes place, thus leading to so-called devitrification. If the temperature exceeds 1,800° C., vaporization of $SiO_2$ tends to be not negligible.

Step (d)

The fictive temperature of the $TiO_2$—$SiO_2$ glass is controlled by carrying out annealing treatment wherein the formed $TiO_2$—$SiO_2$ glass body obtained in step (c) is held at a temperature of from 600 to 1,200° C. for at least 5 hours, and then, the temperature is lowered to not higher than 500° C. at an average cooling rate of at most 10° C./hr. After the temperature is lowered to not higher than 500° C., the glass body may be cooled. The atmosphere in such a case is preferably an atmosphere of 100% inert gas such as helium, argon or nitrogen or an atmosphere containing such an inert gas as the main component, or an atmosphere of air, and the pressure is preferably a reduced pressure or a normal pressure.

Now, the present invention will be described in further detail with reference to Examples. However, it should be understood that the present invention is by no means restricted to such specific Examples. In the glass compositions in the following Examples, $TiO_2=7.4$ mass %, and $SiO_2=92.6$ mass %, in all cases.

EXAMPLE 1

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target made of quartz glass rotating at a rate of 25 rpm, to form a porous $TiO_2$—$SiO_2$ glass body having a diameter of 80 mm and a length of about 100 mm (step (a)).

The obtained porous $TiO_2$—$SiO_2$ glass body was heated to 1,550° C. in an atmosphere of 100% He and held at this temperature for 10 hours for vitrification to obtain a vitrified $TiO_2$—$SiO_2$ glass body (step (b)).

The obtained vitrified $TiO_2$—$SiO_2$ glass body was heated to 1,600° C. i.e. higher than the softening point for deadweight transformation and formed into a block shape of 50 mm×50 mm×10 mm (step (c)). The obtained block was set in an electric furnace and held at 950° C. for 100 hours. Then, the temperature was lowered to 500° C. at a rate of 5° C./hr, and then the block was cooled to room temperature (step (d)) to obtain $TiO_2$—$SiO_2$ glass.

EXAMPLE 2

In the step (a) in Example 1, the $TiO_2$—$SiO_2$ glass particles were deposited and grown on a target made of quartz glass rotating at a rate of 100 rpm. Other than this, in the same manner as in Example 1, $TiO_2$—$SiO_2$ glass was obtained.

EXAMPLE 3

In the step (a) in Example 1, the $TiO_2$—$SiO_2$ glass particles were deposited and grown on a target made of quartz glass rotating at a rate of 250 rpm. Other than this, in the same manner as in Example 1, $TiO_2$—$SiO_2$ glass was obtained.

EXAMPLE 4

In the step (a) in Example 1, the $TiO_2$—$SiO_2$ glass particles were deposited and grown on a target made of quartz glass rotating at a rate of 5 rpm. Other than this, in the same manner as in Example 1, $TiO_2$—$SiO_2$ glass was obtained.

EXAMPLE 5

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target made of quartz glass rotating at a rate of 25 rpm, to form a porous $TiO_2$—$SiO_2$ glass body having a diameter of 30 mm and a length of 80 cm (step (a)).

The obtained porous $TiO_2$—$SiO_2$ glass body was heated to 1,430° C. in an atmosphere of 100% He and held at this temperature for 2 hours for vitrification to obtain a vitrified $TiO_2$—$SiO_2$ glass body (step (b)).

Further, it was heated to 1,680° C. i.e. higher than the softening point for deadweight transformation and formed into a block shape of 160 mm×160 mm×150 mm (step (c)). Then, it was sliced into a block of 7 mm in thickness. The obtained block of 160 mm×160 mm×7 mm was set in an electric furnace and held at 950° C. for 100 hours. Then, the temperature was lowered to 500° C. at a rate of 5° C./hr, and then the block was cooled to room temperature (step (d)) to obtain $TiO_2$—$SiO_2$ glass.

The evaluation was carried out in accordance with the above-mentioned measuring methods, respectively. The results of evaluation of Examples 1 to 5 are summarized in Table 1. Here, Examples 1, 2, 3 and 5 are Examples of the present invention, and Example 4 is a Comparative Example.

TABLE 1

|  | Rotational speed of the target in step (a) (rpm) | Striae pitch (μm) | Fluctuation of the refractive index in an area of 30 mm × 30 mm Δn (ppm) | Fluctuation of the refractive index in an area of 100 mm × 100 mm Δn (ppm) | Fluctuation of the $TiO_2$ concentration $\Delta TiO_2$ (mass %) |
|---|---|---|---|---|---|
| Ex. 1 | 25 | 9 | 190 | — | 0.058 |
| Ex. 2 | 100 | 3 | 55 | — | 0.017 |
| Ex. 3 | 250 | 1 | <50 | — | <0.015 |
| Ex. 4 | 5 | 60 | 400 | — | 0.122 |
| Ex. 5 | 25 | 10 | — | 90 | — |

In Examples 1 and 2, the striae pitch is not more than 10 μm, and in at least one plane, the fluctuation of the refractive index in small areas is not more than 200 ppm, and the fluctuation of the $TiO_2$ concentration is not more than 0.06 mass %. The fluctuation of the refractive index or the fluctuation of the $TiO_2$ concentration are attributable to the striae, and the strength of the striae is reduced in Examples 1 and 2, whereby MSFR can easily be reduced by polishing and it will be possible to be ultra smooth surface.

Further, with these samples, it is seen that also in at least one plane orthogonal thereto, the fluctuation of the refractive index is not more than 200 ppm, and the fluctuation of the $TiO_2$ concentration is not more than 0.06 mass %.

In Example 3, the presence of striae can be visually confirmed, and by the measurement microscope, the striae pitch was confirmed to be 1 μm, but the fluctuation of the refractive index could not be detected by the above-mentioned method. Accordingly, it is considered that the fluctuation of the refractive index is not more than 50 ppm, and the fluctuation of the $TiO_2$ concentration is not more than 0.06 mass %. Accordingly, in Example 3, MSFR can be reduced more easily, and it is possible to obtain ultra smooth surface.

In Example 4, the striae pitch is at least 10 µm, the fluctuation of the refractive index in small areas is at least 200 ppm, and the fluctuation of the $TiO_2$ concentration is at least 0.06 mass %. The degree of striae was very high, and it was difficult to reduce MSFR by polishing.

In Example 5, the fluctuation of the refractive index in a broad area is not more than 200 ppm, and it becomes possible to obtain an optical material for EUV lithography wherein the fluctuation of the refractive index ($\Delta n$) is at most $2\times10^{-4}$ in a plane perpendicular to the incident light direction.

The entire disclosures of Japanese Patent Application No. 2003-100798 filed on Apr. 3, 2003, Japanese Patent Application No. 2003-100799 filed on Apr. 3, 2003 and Japanese Patent Application No. 2004-076312 filed on Mar. 17, 2004 including specifications, claims and summaries are incorporated herein by reference in their entireties.

What is claimed is:

1. A silica glass obtained by flame hydrolysis containing $TiO_2$, characterized in that the fluctuation of the refractive index ($\Delta n$) is at most $5\times10^{-5}$ within an area of 30 mm×30 mm in at least one plane.

2. The silica glass containing $TiO_2$ according to claim 1, wherein the fluctuation of the refractive index ($\Delta n$) is at most $2\times10^{-4}$ within an area of 30 mm×30 mm in each of two orthogonal planes.

3. A silica glass obtained by flame hydrolysis containing $TiO_2$, characterized in that the $TiO_2$ concentration is at least 1 mass %, and the difference between the maximum value and the minimum value of the $TiO_2$ concentration is at most 0.06 mass % within an area of 30 mm×30 mm in at least one plane.

4. The silica glass containing $TiO_2$ according to claim 3, wherein the difference between the maximum value and the minimum value of the $TiO_2$ concentration is at most 0.06 mass % within an area of 30 mm×30 mm in each of two orthogonal planes.

5. A silica glass obtained by flame hydrolysis containing $TiO_2$ characterized in that the $TiO_2$ concentration is at least 1 mass %, and the striae pitch is at most 10 µm.

6. The silica glass containing $TiO_2$ according to claim 1, wherein the striae pitch is at most 10 µm.

7. An optical material for EUV lithography, characterized in that it is made of a silica glass obtained by flame hydrolysis containing $TiO_2$, and the fluctuation of the refractive index ($\Delta n$) is at most $2\times10^{-4}$ in a plane perpendicular to the incident light direction.

8. The optical material for EUV lithography according to claim 7, wherein there is no striae which cause a fluctuation of the refractive index ($\Delta n$) exceeding $2\times10^{-4}$ in a plane perpendicular to the incident light direction.

9. An optical material for EUV lithography, characterized in that it is made of a silica glass obtained by flame hydrolysis containing $TiO_2$, wherein the $TiO_2$ concentration is at least 1 mass %, and the difference between the maximum value and the minimum value of the $TiO_2$ concentration is at most 0.06 mass % in a plane perpendicular to the incident light direction.

10. The optical material for EUV lithography according to claim 9, wherein there is no striae which cause a difference between the maximum value and the minimum value of the $TiO_2$ concentration, exceeding 0.06 mass % in a plane perpendicular to the incident light direction.

11. The optical material for EUV lithography according to claim 1, wherein the striae pitch is at most 10 µm.

12. An optical material for EUV lithography employing the silica glass containing $TiO_2$, as defined in claim 1.

13. The silica glass containing $TiO_2$ according to claim 2, wherein the striae pitch is at most 10 µm.

14. The silica glass containing $TiO_2$ according to claim 3, wherein the striae pitch is at most 10 µm.

15. The silica glass containing $TiO_2$ according to claim 4, wherein the striae pitch is at most 10 µm.

16. The optical material for EUV lithography according to claim 3, wherein the striae pitch is at most 10 µm.

17. The optical material for EUV lithography according to claim 7, wherein the striae pitch is at most 10 µm.

18. An optical material for EUV lithography employing the silica glass containing $TiO_2$, as defined in claim 3.

19. An optical material for EUV lithography employing the silica glass containing $TiO_2$, as defined in claim 7.

* * * * *